US005302837A

United States Patent [19]

Sawa et al.

[11] Patent Number: 5,302,837

[45] Date of Patent: Apr. 12, 1994

[54] PHOTOELECTRIC SMOKE DETECTOR WITH EXPANDED VISUAL FIELD

[75] Inventors: Hiroshi Sawa, Tokyo; Hironobu Kawai; Naoki Kosugi, both of Kanagawa, all of Japan

[73] Assignee: Hochiki Corporation, Tokyo, Japan

[21] Appl. No.: 29,980

[22] Filed: Mar. 12, 1993

Related U.S. Application Data

[63] Continuation of Ser. No. 857,749, Mar. 26, 1992, abandoned.

[30] Foreign Application Priority Data

Mar. 29, 1991 [JP] Japan ................................ 3-089279

[51] Int. Cl.[5] ............................................ G01N 15/06

[52] U.S. Cl. .................................... 250/574; 340/630

[58] Field of Search ................ 250/574; 356/338, 339, 356/340, 341; 340/630

[56] References Cited

U.S. PATENT DOCUMENTS

| | | | |
|---|---|---|---|
| 4,099,178 | 7/1978 | Ranney et al. | 340/630 |
| 4,226,533 | 10/1980 | Snowman | 340/630 |
| 4,906,978 | 3/1990 | Best et al. | 250/574 |
| 5,138,302 | 8/1992 | Nagaoke et al. | 250/574 |

*Primary Examiner*—David C. Nelms
*Assistant Examiner*—K. Shami
*Attorney, Agent, or Firm*—Michael N. Meller

[57] ABSTRACT

A thin-type photoelectric smoke detector which is less susceptible to the effect of disturbance light noise, contamination of a smoke detecting unit, etc., and which ensures high sensitivity for the optical detection characteristic of the smoke detecting section. In the photoelectric smoke detector of the type in which infrared light is irradiated into a flat smoke detecting chamber and the scattered light of the irradiated infrared light due to smoke entering into the smoke detecting chamber is detected by a light-sensing element, there are provided optical members for expanding the visual field of the light-sensing element to a flat visual field corresponding to the cross-sectional shape of the smoke detecting chamber.

1 Claim, 3 Drawing Sheets

PHOTOELECTRIC SMOKE DETECTOR WITH EXPANDED VISUAL FIELD

This application is a continuation of application Ser. No. 857,749, filed Mar. 26, 1992, now abandoned.

BACKGROUND OF THE INVENTION

1. Field of the Invention

The present invention relates to a photoelectric smoke detector and more particularly to the structure of the light-sensing system within its smoke detecting unit.

2. Description of the Prior Art

In the prior art, formed inside a photoelectric smoke detector of the scattered light type is a smoke detecting chamber which communicates with the exterior in a condition where the detector is attached to a ceiling so that in a monitoring mode infrared light is intermittently irradiated into the smoke detecting chamber and a light-sensing element detects the scattered light of the infrared light caused by smoke entering into the smoke detecting chamber. The smoke detecting chamber is generally in the form of a flat cylindrical space which extends along the ceiling and whose outer periphery is surrounded by an insect screening, and arranged on the inner side of the insect screening are a plurality of labyrinth plates which serve the purpose of ensuring the communication with the exterior and preventing the entry of light from the exterior.

A light source including an infrared light emitting diode is arranged at the position of some labyrinth plates within the smoke detecting chamber and the infrared light emitting diode intermittently irradiates infrared light within a relatively wide range of angles in the width direction inside the chamber. Arranged at another position between other labyrinth plates within the smoke detecting chamber is the light-sensing element whose optical axis is extended in a direction which intersects the optical axis of the infrared light emitting diode, and disposed between the light source and the light-sensing element is a light shielding member for preventing the irradiated light from the infrared light emitting diode from directly falling on the light-sensing element. Also arranged at still another position near the peripheral wall of the smoke detecting chamber is a test light emitting diode for irradiating a test light and it faces the light-sensing element. The light-sensing element is generally composed of a photodiode covered with a shielding cap and it has a light sensitivity to both the infrared light from the infrared light emitting diode and the visible light from the test light emitting diode.

When smoke enters into the smoke detecting chamber from the outside through between the insect screening and the labyrinth plates, the infrared light irradiated from the light source is scattered by smoke particles and a part of the scattered light falls on the light-sensing element. The light-sensing element generates a detection output synchronized with the intermittent emission of light from the infrared light emitting diode or the light source so that its magnitude is detected in terms of a smoke density by a suitable electric signal processing circuit and it is utilized for the determination of a fire.

With the above-described conventional photoelectric smoke detector having the thin-type flat smoke detecting chamber, if it is desired to improve the sensitivity of the detector, there is a limitation to the optical detection characteristic of the smoke detecting unit itself and generally it is necessary to increase the gain of the signal amplifying system of the electric signal processing circuit within the detector. In this case, however, the gain in the noise component of the detection output from the optical system is also increased with the result that the detection output is varied considerably by a slight change in the characteristics, such as, the effect of the optical external noise within the smoke detecting chamber and the contamination of the chamber inner wall and the optical system.

SUMMARY OF THE INVENTION

It is a principal object of the present invention to provide a thin-type photoelectric smoke detector which overcomes the foregoing problems in the prior art and which is capable of enhancing the sensitivity of the optical detection characteristic of the smoke detecting unit without practically being subjected to the effect of disturbance light noise, contamination of the smoke detecting chamber inner wall, etc.

In one of its aspects, the present invention is a photoelectric smoke detector in which a source light is irradiated into a flat smoke detecting chamber and scattered light of the source light due to smoke entering into the smoke detecting chamber is detected by a light-sensing element, the detector including optical means for expanding the visual field of the light-sensing element into a flat-shaped visual field corresponding to the sectional shape of the chamber.

In a preferred embodiment of the present invention, the optical means comprises a light-condensing member arranged in front of the photosensitive surface of the light-sensing element.

In another preferred embodiment of the present invention, the optical means further comprises a field stop member arranged in front of the light-condensing member.

In still another preferred embodiment of the present invention, the field stop member is composed of a resin molding having a rectangular slit-shaped stop opening, and also a circumferential groove is formed in the inner peripheral surface of the opening.

By virtue of the fact that the photoelectric smoke detector of the present invention includes the optical means for flatly expanding the visual field of the light-sensing element in the smoke detecting section, even if a photodiode which itself has a relatively small detection visual field is used as the light-sensing element, the scattered light due to the smoke within the smoke detecting chamber can be detected with a wide visual field and it is possible to improve the S/N ratio of the detector and ensure a high degree of sensitivity without considerably increasing the gain of the signal processing electric circuit. Further, since the gain of the electric circuit need not be increased, there is the effect of making it less susceptible to the effect of disturbance noise due to external light and the contamination of the smoke detecting unit and simultaneously reducing the effect of variations in characteristic values of the components used and electric variations such as variations in the power supply voltage and variations in the circuit voltage, thereby realizing a photoelectric smoke detector capable of producing a detection output which is high in reliability. Still further, since the visual field of the light-sensing element is cut flatly, it is possible to make it less susceptible to the effect of contamination of the upper and lower end faces of the smoke detecting chamber thus constructing the smoke detecting chamber to become thinner than previously and thereby making the detector to be of the thin type.

The invention will become more fully apparent from the following detailed description thereof taken in conjunction with the accompanying drawings.

DESCRIPTION OF THE PREFERRED EMBODIMENTS

Figure 1A:
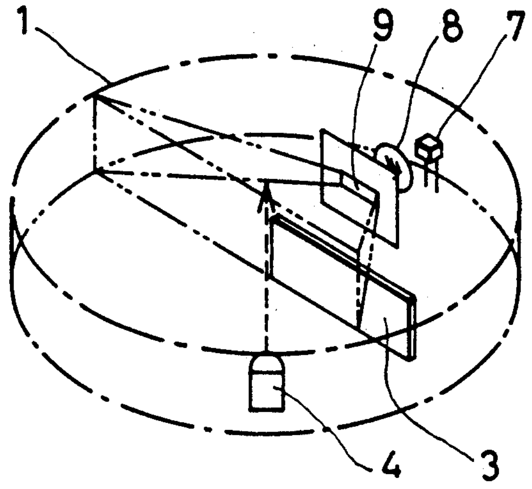
FIGS. 1A to 1D are perspective optical path diagrams for four basic exemplary constructions showing the principles of a smoke detecting optical system of a photoelectric smoke detector according to the present invention.

Now describing the operation of the present invention with reference to the principle diagrams of FIGS. 1A to 1D corresponding to its embodiment, in FIG. 1A a smoke detecting chamber 1 of a photoelectric smoke detector is in the form of a flat cylindrical space and it includes end walls composed of closed faces and a periphery composed of a communicating wall which blocks the entry of any external light and permits the entry of external air. Arranged between labyrinth plates within the chamber 1 is an infrared light emitting diode 4 for irradiating an intermittent infrared light toward the center in a sufficiently wide range of angles, and also arranged at a position between another labyrinth plates is a light-sensing photodiode 7 having its optical axis extended to cross the optical axis of the infrared light emitting diode 4 and its photosensitive surface directed toward the chamber center, with a light shielding member 3 being arranged between the former so as to prevent the irradiated light from the infrared light emitting diode 4 from directly falling on the light-sensing photodiode 7.

The light-sensing photodiode 7 has a relatively small visual field and its photosensitive surface has a square area of 3 mm×3 mm, with the result that when the interior of the chamber is looked through the photodiode alone, only an extremely limited area of the chamber interior comes into the visual field. As a result, when smoke enters into the chamber 1 from the outside, not only the chance of the smokeinduced scattered light of the infrared light irradiated from the infrared light emitting diode 4 falling on the photosensitive surface of the photodiode 7 is also limited but also the quantity of light received is comparatively less even if the scattered light falls. In accordance with the present invention, as for example, a lens 8 and a field stop member 9 are arranged as the optical means having a light-condensing function in front of the photosensitive surface of the photodiode 7. In this case, as the lens 8, an aspherical convex lens for expanding the visual field of the photodiode 7 with respect to the 360-degrees or in all directions about its optical axis is shown by way of example so that in order that its visual field may become a flat-shaped expanded visual field in correspondence to the cross-sectional shape of the chamber, a field stop member having a flat slit-shaped stop opening 9 for hiding the end faces of the chamber 1 from the expanded visual field is arranged in front of the lens 8. The light from the flat visual field expanded by these optical members is then condensed into a spot of about the same size as the effective area of the photosensitive surface of the photodiode 7 on this photosensitive surface.

By virtue of the arrangement of such optical members, the visual field of the photodiode 7 becomes an expanded visual field which flatly surveys the interior of the chamber 1 in correspondence thereto and the end faces of the chamber 1 do not come into the visual field. As a result, when smoke enters into the chamber from the outside, with the smoke-induced scattered light of the infrared light irradiated from the infrared light emitting diode 4 within the chamber, the chance of it falling on the photosensitive surface of the photodiode 7 is increased in correspondence to the amount of expansion of the visual field and also the amount of incidence of the scattered light to the photodiode 7 is increased for the same smoke density as in the case of the conventional device, thereby decreasing the danger of being subjected to the effect of noise due to external light, contamination of the various parts and optical systems within the chamber, etc. On the other hand, even if the visual field is expanded, the chamber end faces do not come into the visual field so that there is a considerable decrease in the possibility of the scattered noise due to such contamination as dust and droplets on the end faces falling on the light-sensing photodiode 7. Consequently, the arrangement of the optical members has the effect of improving the signal-to-noise ratio (S/N ratio) of the optical detection system in the smoke detecting section and attaining an increase in the sensitivity of the detector.

Figure 1C:
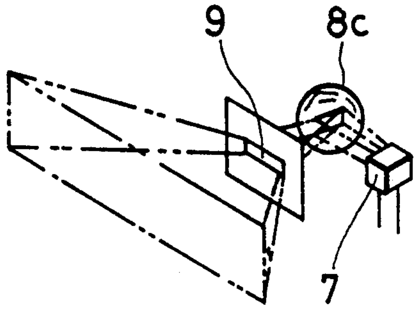
Figure 1B:
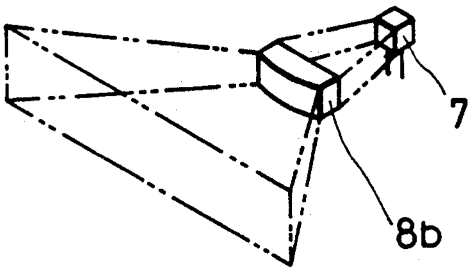
Figure 1D:
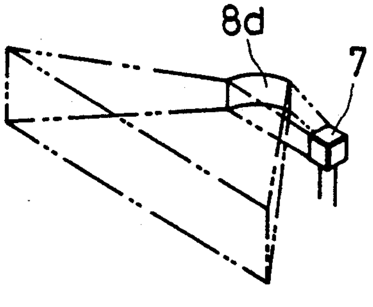

The optical means according to the present invention is not limited to the above-mentioned combination so that if it comprises for example a cylindrical lens 8*b* as shown in FIG. 1B, it can provide by itself the photodiode 7 with a flat expanded visual field. Also, the same effect can be obtained by using a nonspherical circular concave mirror 8*c* in combination with the field stop opening 9 in place of the lens as shown in FIG. 1C or by using a nonspherical elongated concave mirror 8*d* singly as shown in FIG. 1D.

Where the field stop member is provided in the present invention, this field stop member is advantageously formed as an integral part of the body component part by resin molding. While, in this case, idealy the inner peripheral edge of the stop opening of the field stop member is formed to have a knife edge-like sectional shape, if the molding is effected by injection molding, there is the danger of failing to satisfactorily filling the injected resin into the extremely limited space of the mold which provides the knife edge-like sectional shape and the shape of the stop opening fails to become as desired. While, in this case, it is essential that the field stop member is formed into a plate wall shape of a certain thickness and that the inner peripheral edge of its stop opening takes the form of a flat surface, the presence of such flat inner peripheral surface of a thickness width in front of the light-sensing photodiode causes contamination and reflection at the inner peripheral surface to become new causes of noise. Therefore, in accordance with a preferred embodiment of the present invention, a groove extending in the circumferential direction of the stop opening is provided in the inner peripheral surface of the stop opening molded to have a certain thickness width for such molding reasons thus reducing the apparent area of the inner peripheral surface as looked from the light-sensing photodiode and thereby reducing the previously mentioned causes of noise. Also, the groove serves the function of drawing the deposited water drops into the groove and thus any increase in noise due to the deposition of water drops is prevented.

Figure 2:
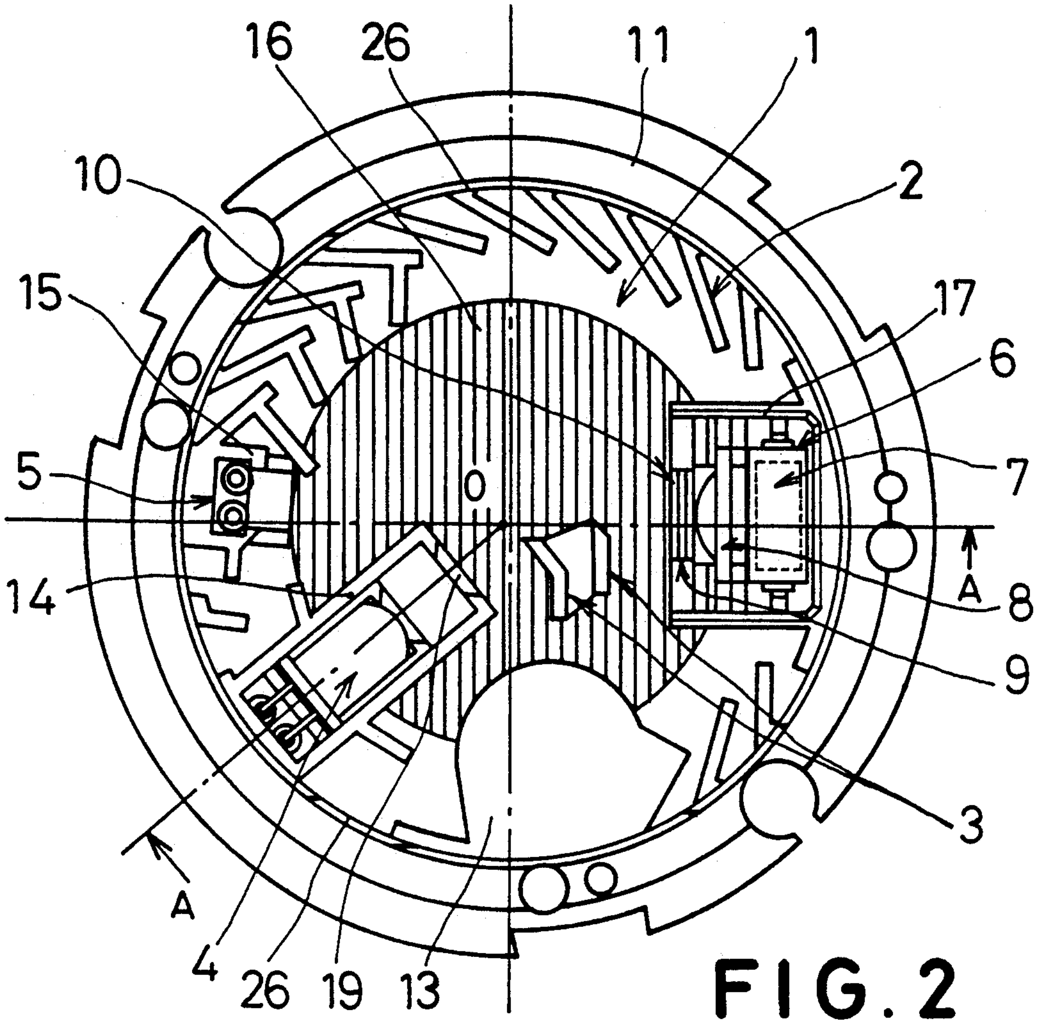
FIG. 2 is a cross-sectional view for a smoke detecting unit of a photoelectric smoke detector according to a definite embodiment of the present invention.
Figure 3:
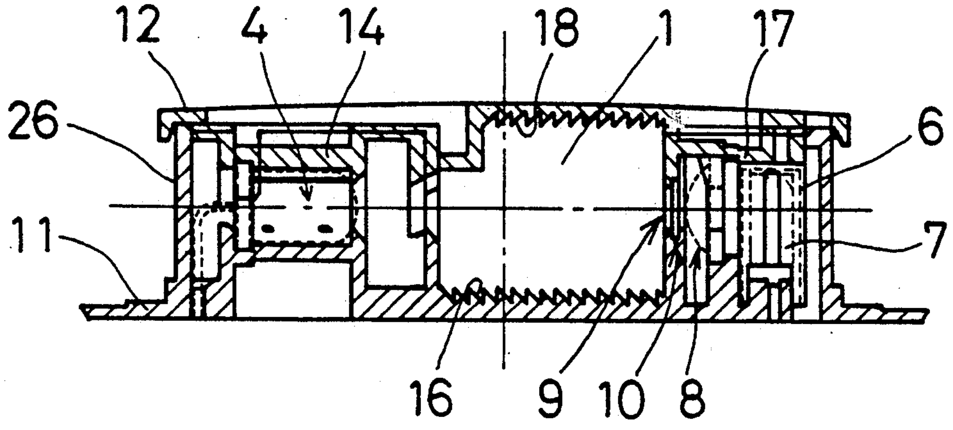
FIG. 3 is a longitudinal sectional view looked in the direction of an arrowed line A-O-A in FIG. 2.

Now describing a definite embodiment of the present invention with reference to the drawings, FIGS. 2 and 3 are respectively a cross-sectional view of a smoke detecting unit constituting a principal part of a photoelectric smoke detector according to the present embodiment and a longitudinal sectional view looked in the direction of an arrowed line A-0-A. In FIGS. 2 and 3, the unit includes a body 11 composed of a resin molding and a cover 12 combined with the body 11, and a plurality of labyrinth plates 2 are integrally resin-molded on the peripheral side of the body 11. Also, an infrared light emitting diode 4 serving as a light source, a visible light emitting diode 5 for testing purposes and a light-sensing photodiode 7 are respectively fitted into mounts 14, 15 and 17 which are made integral with the body 11. Also molded integrally with the body 11 is a capacitor receiver 13 for accommodating a capacitor mounted on a printed wiring board. An insect screening 26 is integrally attached to the plurality of labyrinth plates 2, the diode mounts 14, 15 and 17 and the outer peripheral wall of the capacitor receiver 13. In addition, as shown in FIG. 3, the inner surfaces of the body 11 and the cover 12 are respectively composed of reflection preventive surfaces 16 and 18 formed into sawtooth shape in section in an inner area surrounded by the plurality of labyrinth plates 2, the diode mounts 14, 15 and 17 and the capacitor receiver 13 so that even if the irradiated beam of light from the infrared light emitting diode 4 or the visible light emitting diode 5 strikes against these inner surfaces, the directly refected beams are prevented from largely falling on the light-sensing photodiode 7. The space surrounded by the plurality of labyrinth plates 2 and the diode mounts 14, 15 and between the inner surfaces 16 and 18 is the smoke detecting chamber 1, and the chamber 1 forms substantially a flat cylindrical space.

In FIG. 2, when looked in cross section, the optical axes of the light emitting diodes 4 and 5 and the light-sensing photodiode 7 are practically directed toward the central axis of the chamber 1, and the optical axis of the infrared light emitting diode 4 and the optical axis of the light-sensing photodiode 7 cross each other at a certain angle. A light shielding member 3 is molded integrally with the body 11 between the infrared light emitting diode 4 and the light-sensing photodiode 7 so that the infrared light irradiated from the infrared light emitting diode 4 does not directly fall on the light-sensing photodiode 7.

The mount 14 for the mounting of the infrared light emitting diode 4 is of the box shape made integral with the body 11 by resin molding and an opening 19 is formed in its surface facing the chamber center, with the inner peripheral surface of the opening 19 being composed of a tapered surface inclined to spread toward the outside of the box as apparent in FIGS. 2 and 3.

Figure 4:
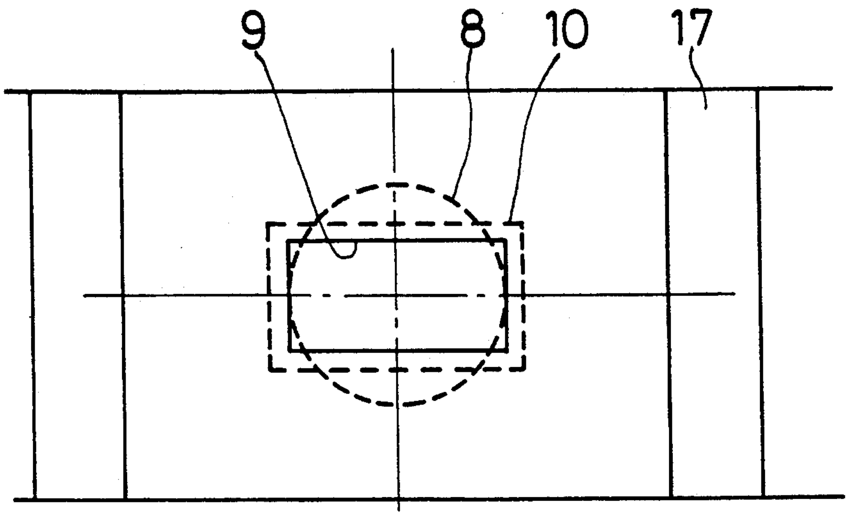
FIG. 4 is an enlarged view of the arrangement of the optical members in the above-mentioned embodiment as looked in the direction of the optical axis.

The mount 17 for the mounting of the light-sensing photodiode 7 is also of the box shape made integral with the body 11 by resin molding and its surface facing the chamber center is formed with a stop opening 9 of a flat slit shape, with the inner peripheral surface of the opening 9 having a certain thickness so that a groove 10 extending along the circumferential direction is formed in practically the middle of the thickness. The photodiode 7 is mounted inside the mount 17 and in the rear of the stop opening 9 and a shielding cap 6 is removably fitted on the photodiode 7. A circular nonspherical convex lens 8 is mounted between the stop opening 9 and the photodiode 7 within the mount 17 and in this case the lens 8 is constructed by fitting a separately formed plastic lens with an engagement mechanism integrally molded on the inner surface of the mount 17. When the arrangement of the stop opening 9 and the lens 8 is looked in the direction of the optical axis of the photodiode 7 from the chamber center, the mount 17 attains such positional relation which causes the optical axes of these three optical elements to coincide as shown in FIG. 4.

Figure 5:
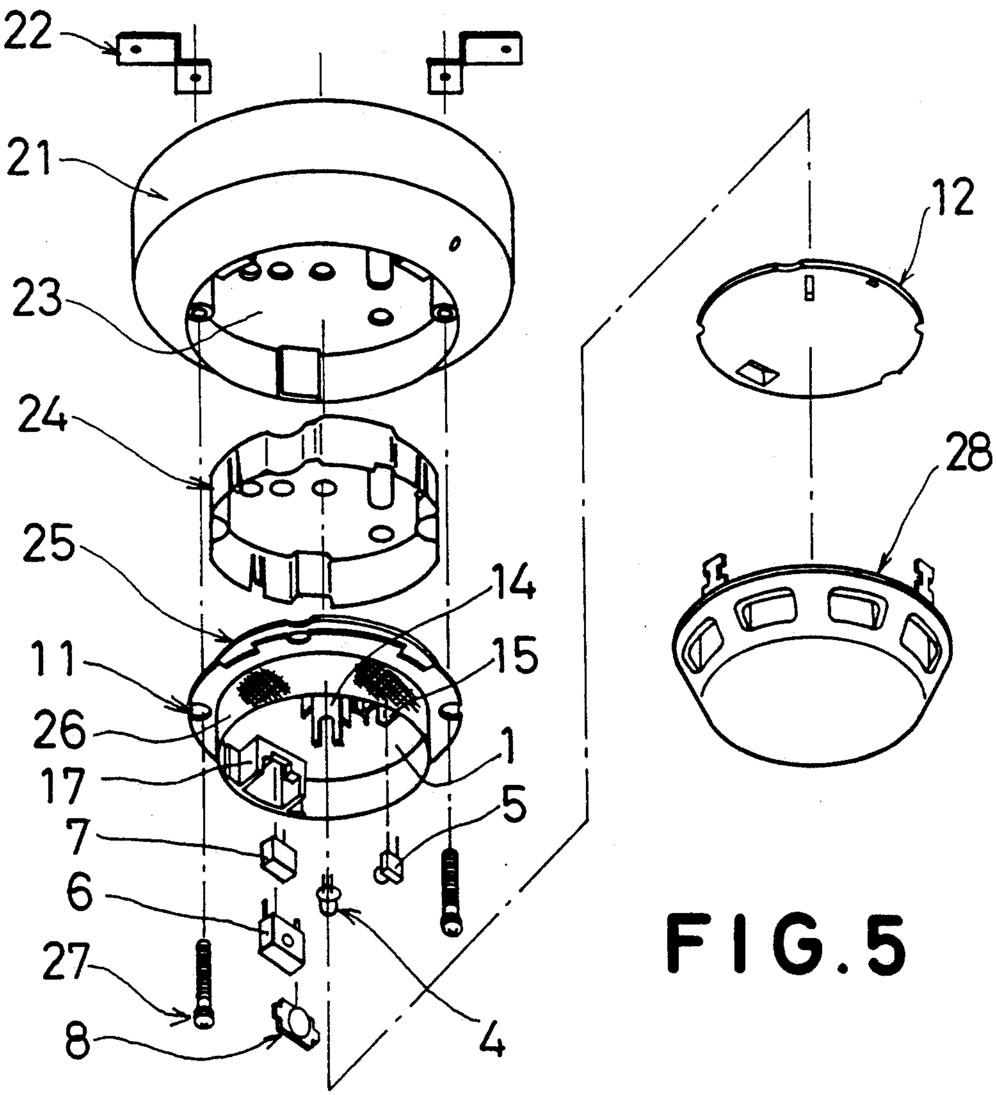
FIG. 5 is an exploded perspective view showing the assembly of a photoelectric smoke detector employing the smoke detecting unit according to the above-mentioned embodiment.

The smoke detecting unit constructed as described is assembled for example with other necessary components as shown in FIG. 5 thereby completely a photoelectric smoke detector. In FIG. 5, a housing 21 is provided on its upper surface with connecting blades 22 for its mechanical and electrical connection with a base member attached separately to the ceiling or the like and on its lower side with a cavity 23 for accommodating a printed wiring board having an electric circuit mounted thereon. A shielding case 24 is inserted into the cavity 23 along the inner peripheral surface thereof and a printed wiring board 25 is accommodated on the inner side of the case 24. In this embodiment, the printed wiring board 25 is attached to the back side of the smoke detecting unit body 11. The insect screening 26 covers the periphery of the smoke detecting unit body 11 with the infrared light emitting diode 4, the test light emitting diode 5, the light-sensing photodiode 7, the shielding cap 6, the lens 8, etc., being mounted in the mounts 14, 15 and 17, respectively, within the smoke detecting chamber 1 as mentioned previously, and the cover 12 is attached to the body 11 so as to close the chamber 1. This smoke detecting unit is assembled by fastening the body 11 to the housing 21 with screws 27. Lastly, an outer cover 28 formed with openings is mounted on the housing 21 thereby covering the outer side of the smoke detecting unit.

In the monitoring condition, this photoelectric smoke detector is controlled by its internal electronic circuitry so that the infrared light emitting diode 4 is intermittently driven and thus the infrared light is irradiated into the smoke detecting chamber 1 from the infrared light emitting diode. Since it is so designed that the irradiated infrared light does not directly fall on the photodiode 7 in the absence of any smoke within the smoke detecting chamber 1, the output level of the detector is at a level corresponding to the fact that the smoke density is zero. When smoke is produced by a cause such as a fire on the outside of the detector, the smoke enters into the smoke detecting chamber 1 through the openings of the outer cover 28 and through the insect screening 26 and the spaces between the labyrince plates.

The infrared light is intermittently irradiated from the infrared light emitting diode 4 within the smoke detecting chamber 1 so that when the infrared light impinges on the smoke entering into the chamber 1, the infrared light is scattered by the smoke particles and the scattered light is captured by the stop opening 9 and the lens 8, thereby causing it to fall on the photosensitive surface of the light-sensing photodiode 7. In this case, since the photodiode 7 is provided with a visual field of a wide angle by the lens 8, the scattered light produced within the chamber 1 is received from a wide area and thus both the chance of detection and the amount of incident light are increased. Also, since the visual field expanded by the lens 8 is flatly cut by the stop opening 9 in such a manner that the end faces 16 and 18 of the chamber 1 come out of the visual field, no effect is produced on the detection by the undesired light noise at the end faces. Further, due to the presence of the groove 10 in the inner peripheral surface of the stop opening 9, even if such contaminant as dust is deposited on this inner peripheral surface, the resulting noise can be reduced effectively. The resulting incident light to the light-sensing photodiode 7 is converted to an electric quantity and processed by an internal signal processing circuit. The resulting detector output contains information corresponding to the then current smoke density within the smoke detecting chamber 1.

What is claimed is:

1. A photoelectric smoke detector comprising:

a light source means, a smoke detecting chamber with a circular shape in a first plane having a diameter much greater than a linear dimension i a second plane being substantially 90 degrees from said first plane, a source light that is irradiated from said light source means into said smoke detecting chamber, a light-sensing element for detecting scattered light of said source light due to smoke entering into said smoke detecting chamber, an optical means for expanding a visual field of said light-sensing element into a flat visual field corresponding to a sectional shape of said chamber;

wherein said optical means includes a light-condensing member arrange din front of a photosensitive surface of said light-sensing element, wherein said optical means further includes a field stop member arranged in front of said light-condensing member, wherein said field stop member comprises a resin molding having a rectangular slit-shaped stop opening; and wherein said opening has an inner peripheral surface in which a groove is formed.

* * * * *